A. M. GOVAERTS.
FOOT LIFT FOR PLOWS.
APPLICATION FILED SEPT. 16, 1914.
1,149,129. Patented Aug. 3, 1915.
2 SHEETS—SHEET 1.
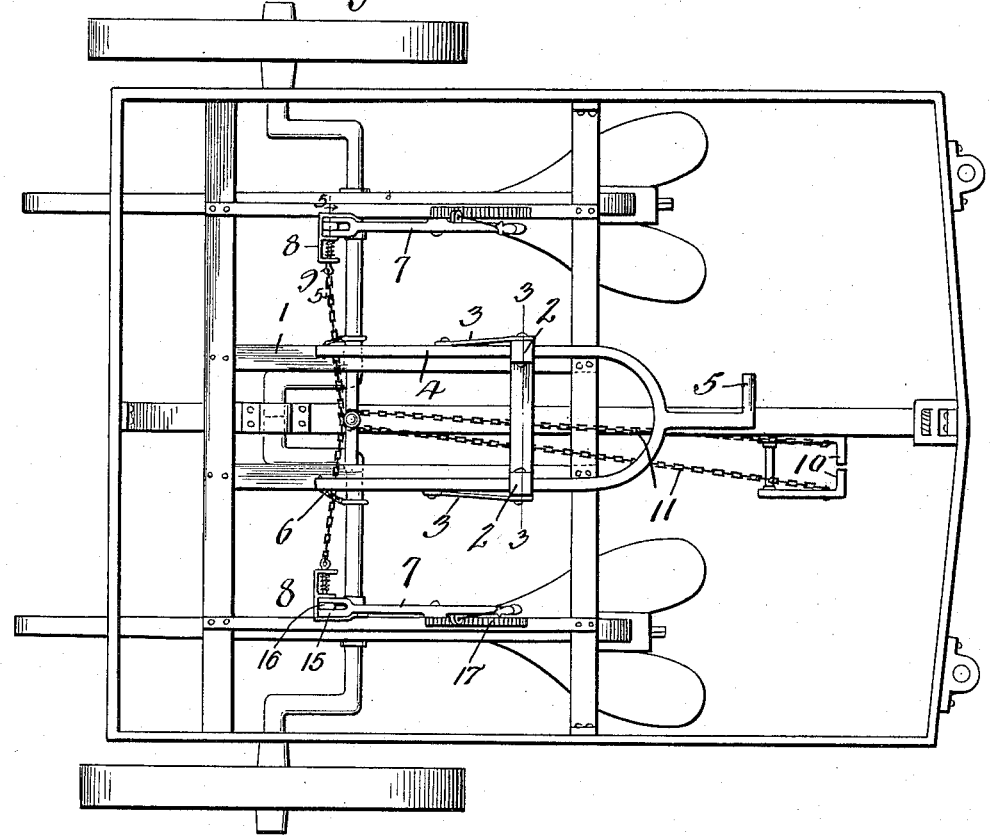
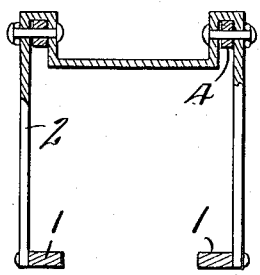
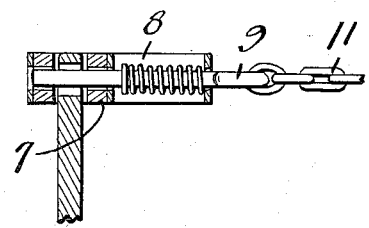

A. M. GOVAERTS.
FOOT LIFT FOR PLOWS.
APPLICATION FILED SEPT. 16, 1914.
1,149,129.
Patented Aug. 3, 1915.
2 SHEETS—SHEET 2.
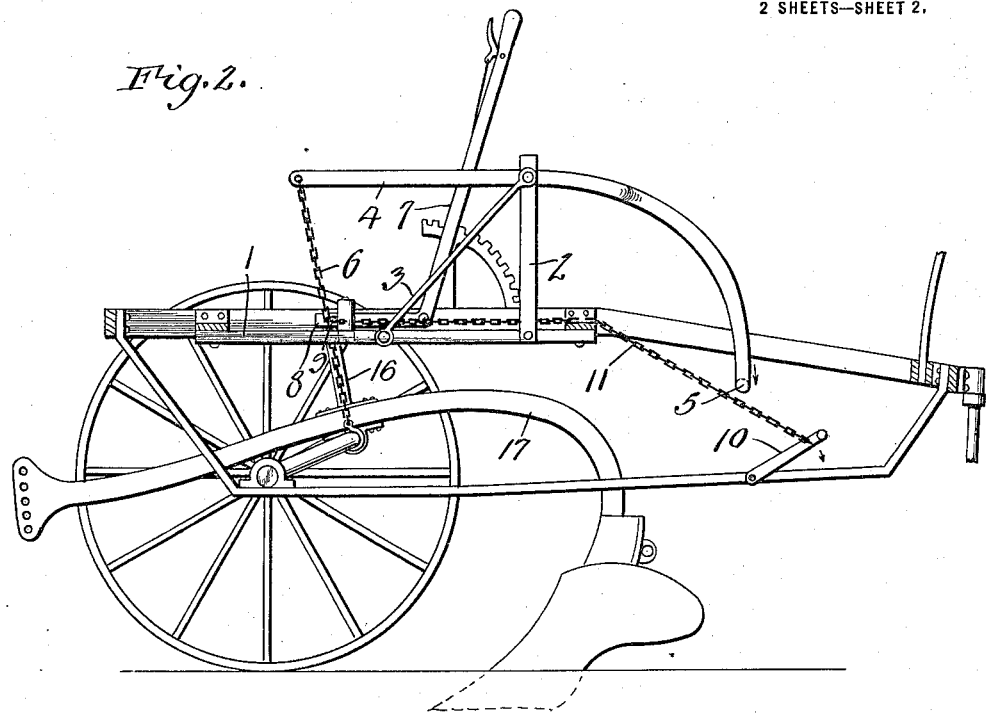
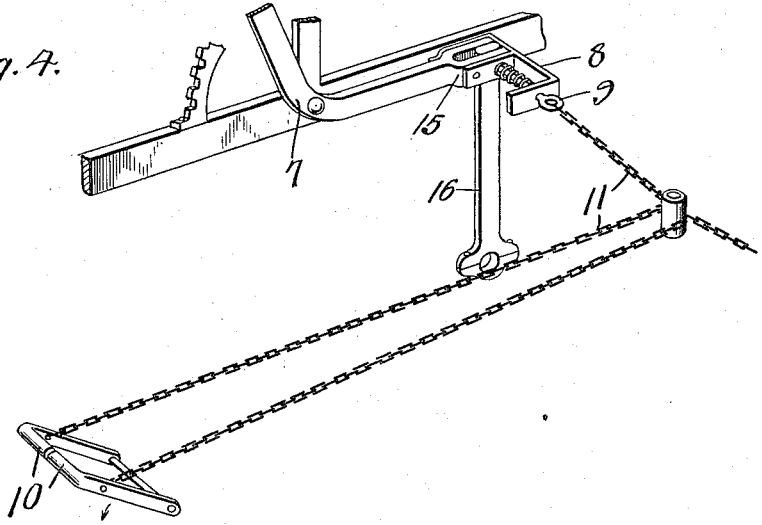
Witnesses
Inventor
A. M. Govaerts,
By Victor J. Evans
Attorney

UNITED STATES PATENT OFFICE.

ALEXANDER M. GOVAERTS, OF WEISSERT, NEBRASKA.

FOOT-LIFT FOR PLOWS.

1,149,129. Specification of Letters Patent. Patented Aug. 3, 1915.

Application filed September 16, 1914. Serial No. 862,051.

*To all whom it may concern:*

Be it known that I, ALEXANDER M. GOVAERTS, a citizen of the United States, residing at Weissert, in the county of Custer and State of Nebraska, have invented new and useful Improvements in Foot-Lifts for Plows, of which the following is a specification.

The invention pertains to agricultural implements and chiefly to field machinery which is adapted to be propelled over the ground for tilling the same. In this class of implements, it is necessary to have the earth tilling devices mounted so as to be adjusted vertically to regulate their depth of action. In case the implement is constructed to be drawn over the field by means of a draft animal or team, the driver is generally required to use both hands for controlling the team hence it is desirable to have the operating parts constructed and arranged to be actuated by the feet thereby leaving the hands free for proper manipulation of the driving lines.

The invention consists of novel foot controlling means whereby the parts previously operated by hand may be released or whereby the beam adjusting means may be operated by foot power and subsequently released by foot through the instrumentality of suitable connections.

The invention further consists of the novel features, details of construction and combination of parts, which hereinafter will be more particularly set forth, illustrated and claimed.

In the drawings hereto attached:—Figure 1 is a top plan view showing the invention applied to a listing plow. Fig. 2 is a longitudinal section. Fig. 3 is a transverse section. Fig. 4 is a perspective detail view bringing out more clearly the means whereby the setting mechanism of the lister may be released by foot. Fig. 5 is a sectional detail view on an enlarged scale taken on the line 5—5 in Fig. 1.

Corresponding and like parts are referred to in the following description, and indicated in all the views of the drawings by the same reference characters.

The invention is shown applied to a listing plow or cultivator of ordinary construction.

The attachment comprises a frame 1 which is adapted to be secured to the frame of the plow or cultivator. An upright frame 2 is secured to the frame 1 and is stayed by means of braces 3. A lever 4 of the forked type is pivoted by means of its fork members to the upright frame 2 and one end is formed with a pedal 5 to receive a foot of the driver. The fork members of the lever 4 are adapted to be connected by short chains 6 to the beams of the lister or cultivator. Pressure upon the pedal 5 depresses one end of the lever 4 and elevates the opposite end with the result that the beams of the lister are correspondingly raised.

The operating lever 7 of the lister is arranged in the ordinary way and is provided with means for holding the same in the required adjusted position. The end of the lever 7 is forked, as shown at 15, for the reception of one end of a link 16, the other end of which is connected with the axle bail. A frame 8 is connected with the forked end of the operating lever 7 and is provided with a spring actuated lock pin 9 which is adapted to engage the upper end of the link 16 which is thereby pivotally connected with the lever. When the lock pin is retracted so as to disconnect the link 16 from the lever, said link will be guided between the limbs of the forked end of the lever and the frame 8 so that it will not be liable to swing out of the way. A foot lever 10 is connected by means of a flexible element, such as a chain 11, with a spring actuated lock pin 9 which may thereby be retracted, thus disconnecting the upper end of the link 16 from the lever 7. The operator may then, by pressing downward on the pedal 5, elevate the plow from the ground, it being evident that these operations may be performed without using either hand. Thus, it will be seen that by means of the lever 7, when the link 16 is connected with said lever by means of the pin 9, the plow may be set for operation at the desired depth in the ground, and will be held in such position by the joint action of the lever 7, the link 16 and the conventional means used for retaining the lever in adjusted position. Should it be desired to lift the plow from the ground, the operator by stepping on the foot lever 10 retracts the lock pin 9, after which the plow may be raised from the ground by pressure on the pedal 5 of the lever 4, as above set forth.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative and that such changes may be made when desired as are within the scope of the invention as claimed.

Having thus described the invention, what is claimed as new is:—

1. In an implement of the class described, a frame, a plow beam, an adjusting lever having a forked end, means for connecting the plow beam with the lever including a link, and a spring actuated lock pin whereby one end of the link is pivotally connected with the lever, and a frame supporting the lock pin and serving to guide the link between the limbs of the forked end of the lever when the lock pin is retracted.

2. In an implement of the class described, a frame, a plow beam, an adjusting lever, means connecting the plow beam with the adjusting lever including a link and a spring actuated lock pin pivotally connecting one end of said link with the lever, foot operable means for retracting the lock pin, a foot lever, and a flexible connection between the foot lever and the plow beam for lifting the latter when the lock pin is retracted.

In testimony whereof I affix my signature in presence of two witnesses.

ALEXANDER M. GOVAERTS.

Witnesses:
W. L. McCandless,
L. G. Davolt.

Copies of this patent may be obtained for five cents each, by addressing the "Commissioner of Patents, Washington, D. C."